US012613696B2

(12) United States Patent　　　(10) Patent No.:　US 12,613,696 B2
Syed et al.　　　　　　　　　　　　(45) Date of Patent:　Apr. 28, 2026

(54) SYSTEM, APPARATUS AND METHOD FOR THROTTLING FUSION OF MICRO-OPERATIONS IN A PROCESSOR

(71) Applicant: Intel Corporation, Santa Clara, CA (US)

(72) Inventors: Sufiyan Syed, Chennai (IN); Roger Gramunt, Portland, OR (US); Jayesh Gaur, Bangalore (IN); Priyank Deshpande, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 929 days.

(21) Appl. No.: 17/558,978

(22) Filed: Dec. 22, 2021

(65) Prior Publication Data

US 2023/0195456 A1　　Jun. 22, 2023

(51) Int. Cl.
　　*G06F 9/28*　　　　(2006.01)
　　*G06F 1/3234*　　　(2019.01)
　　*G06F 1/329*　　　(2019.01)
　　*G06F 9/22*　　　　(2006.01)
　　*G06F 9/38*　　　　(2018.01)
　　*G06F 9/48*　　　　(2006.01)
　　*G06F 9/50*　　　　(2006.01)

(52) U.S. Cl.
　　CPC ................ *G06F 9/28* (2013.01); *G06F 9/223* (2013.01); *G06F 9/4806* (2013.01); *G06F 9/5027* (2013.01); *G06F 1/3243* (2013.01); *G06F 1/329* (2013.01); *G06F 9/3836* (2013.01); *G06F 9/3853* (2013.01); *G06F 2209/5014* (2013.01)

(58) Field of Classification Search
　　CPC .......... G06F 9/28; G06F 9/223; G06F 9/4806; G06F 9/5027; G06F 2209/5014; G06F 9/3836; G06F 9/3853; G06F 1/3243; G06F 1/329
　　See application file for complete search history.

(56) References Cited

U.S. PATENT DOCUMENTS 8,082,430 B2 * 12/2011 Valentine .............. G06F 9/3863
　　　　　　　　　　　　　　　　　　　712/245
9,886,277 B2 * 2/2018 Loktyukhin .......... G06F 9/3017
　　　　　　　　　　　　(Continued)

OTHER PUBLICATIONS

European Patent Office, Extended European Search Report dated Apr. 19, 2023 in European Patent Application No. 22208772.8 (7 pages).

(Continued)

*Primary Examiner* — Michael W Ayers
(74) *Attorney, Agent, or Firm* — NICHOLSON DE VOS WEBSTER & ELLIOTT LLP

(57) ABSTRACT

In one embodiment, an apparatus includes: a plurality of execution circuits to execute and instruct micro-operations (μops), where a subset of the plurality of execution circuits are capable of execution of a fused μop; a fusion circuit coupled to at least the subset of the plurality of execution circuits, wherein the fusion circuit is to fuse at least some pairs of producer-consumer μops into fused μops; and a fusion throttle circuit coupled to the fusion circuit, wherein the fusion throttle circuit is to prevent a first μop from being fused with another μop based at least in part on historical information associated with the first μop. Other embodiments are described and claimed.

11 Claims, 9 Drawing Sheets

100

(56) References Cited

U.S. PATENT DOCUMENTS

| | | | |
|---|---|---|---|
| 10,846,093 B2 | 11/2020 | Bandishte | |
| 11,797,287 B1 * | 10/2023 | Ghai | G06F 8/65 |
| 2017/0109199 A1 * | 4/2017 | Chen | G06F 9/5027 |
| 2018/0129498 A1 | 5/2018 | Levison et al. | |
| 2020/0019402 A1 * | 1/2020 | Walters | G06F 9/30181 |
| 2020/0387377 A1 | 12/2020 | Tseng et al. | |
| 2020/0387382 A1 | 12/2020 | Tseng et al. | |
| 2021/0334098 A1 * | 10/2021 | Scrbak | G06F 9/262 |

OTHER PUBLICATIONS

Decision to grant a European patent, EP App. No. 22208772.8, May 31, 2024, 2 pages.
European Search Report and Search Opinion, EP App. No. 22208772.8, Apr. 19, 2023, 7 pages.
Intention to grant, EP App. No. 22208772.8, Feb. 13, 2024, 9 pages.

* cited by examiner

100

SYSTEM, APPARATUS AND METHOD FOR THROTTLING FUSION OF MICRO-OPERATIONS IN A PROCESSOR

BACKGROUND

Many modern processors, including wide and deep out-of-order processors, are typically limited by their maximum frequency. As such, many workloads are limited by the frequency and can result in performance glass-jaws as compared to smaller width processors that have more frequency headroom. While various solutions exist to improve workload performance, some optimizations can actually decrease performance, and at a cost of additional power consumption.

DETAILED DESCRIPTION

Figure 1:
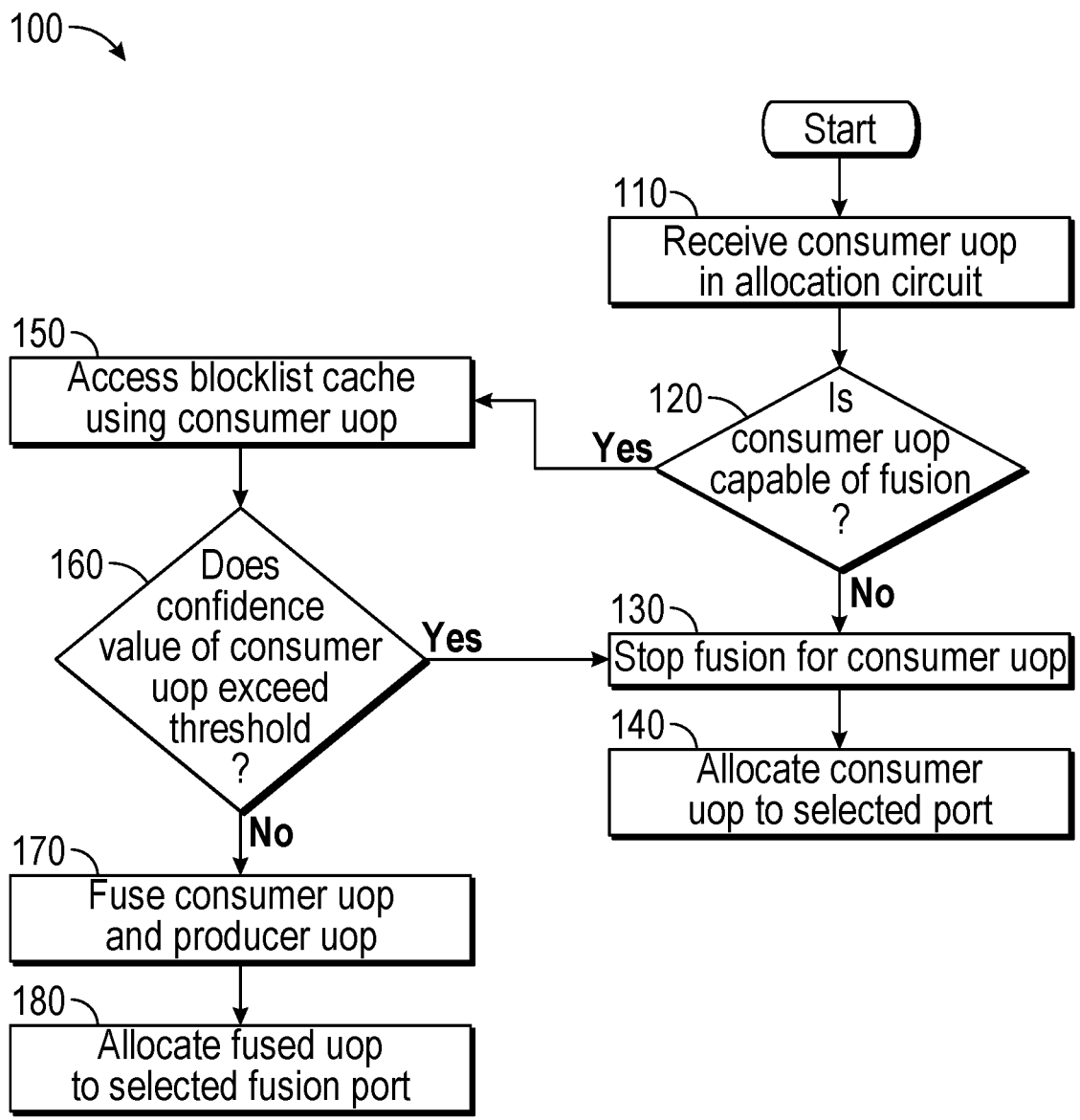
FIG. 1 is a flow diagram of a method in accordance with an embodiment.

In various embodiments, a processor may be configured to increase performance by seeking to fuse together certain instructions having a producer-consumer relationship. More specifically, after decoding macro-instructions into micro-operations (μop's), processor circuitry may identify certain pairs of instructions that are eligible for fusion. This fusion technique may dynamically create new μops by fusing producer μops with their consumer μops and executing them together on a special execution unit. For example, a producer μop that does an ADD operation can execute together with its consumer μop (which can also be an ADD operation) on a special execution unit that performs two ADDs together in the same cycle. This reduces the latency of dependency chains and gains performance.

In one or more examples, this fusion technique uses special execution units that effectively execute μops with more than two source operands. Each special arithmetic unit hence pays an extra cost for an additional physical register file (PRF) and a bypass read port. Supporting special arithmetic units to perform μop fusion at all execution ports can be very costly. Moreover, executing fused μops for all cases can cause power issues.

Thus a processor may be configured with a mixture of regular execution units and so-called fusion execution units. With embodiments, intelligent throttling of μop fusion may be realized by understanding relative scheduling times between a producer-consumer pair. In doing so, consumer μops that do not gain from fusing can be throttled (from being fused). Stated another way, this throttling is a hardware-based determination made at allocation time to determine, e.g., based on historical information associated with a particular μop, whether the μop is an appropriate candidate for fusion with another μop. In this way, the benefits of μop fusion can be achieved with a lower number of fusion ports (and hence a lower number of PRF read ports).

Embodiments may leverage the understanding that fusion is done to break a chain between the producer and consumer, and thus to benefit from fusion, a consumer is to be scheduled either before or in the same cycle as the producer. Further, a difference in dispatch times of the producer and consumer is possible only where a fusion with a wrong producer occurred. This situation may occur when there are other dependencies for this consumer that complete after the producer's dependencies complete. In such cases, μop fusion does not enhance performance. Also a consumer may not timely dispatch with a producer due to a lack of execution ports, which could have been taken by some other older μop. In this case also, μop fusion does not yield benefits.

In one or more embodiments certain scenarios such as those described above may be identified. Then consumer μops that do not schedule in the same cycle as the producer μop it is associated with (or earlier) are prevented from being fused. In this way, embodiments may reduce pressure on a limited amount of fusion ports, particularly where there is a lot of fusion potential.

To perform fusion throttling as described herein, instructions that do not benefit from fusion can be identified. In one or more examples, historical information regarding these instructions can be stored in a processor memory. For example, information may be stored in a linear instruction pointer (LIP) program counter (PC)-tagged cache. Every time that the fusion for an instruction (μop) that was performed was not useful, the instruction LIP is added to the cache. This usefulness determination may be based on whether the instruction could have scheduled on a regular port without any performance impact. In one example, a number of port retries may be used as a proxy for performance impact. A confidence counter may be updated based on a retry count, and this counter can be used to determine whether to fuse μops or not.

In general, μop fusion may be used for workloads that do not benefit from an increased width of a processor. These workloads have chains of dependencies, such that benefit may be realized by fusion. For example, assume the following: A←B←C←D. In this chain of dependency, D is dependent on C which is in turn dependent on B which is dependent on A. The μop fusion operation takes B's sources and the instruction corresponding to B and adds it on to C. Thereby, C can dispatch independently of B when A completes. Likewise, D can take the producers of C and dispatch independently. This approach incurs double execution of B and C and therefore uses special (fusion) ports for C and D respectively.

Fusing every μop can cause an increase in power consumption and may not enhance performance in certain instances. Thus in some cases, power consumption may be reduced by performing fewer fusions, while attaining the same performance level (e.g., the number of cycles to execute a set of instructions).

For example, with a dependency chain with A→B→C→D→E→F→G, naively fusing all μops results in creating B', C', D', E', F', G'. However, C' cannot schedule without A completing, likewise E' cannot execute without C and G' cannot execute without E. Breaking the chain by not fusing alternate μops creates B', D', F'. Now, the unfused μops (A, C, E) will still schedule in the same cycle as their fused counterparts. However, these μops on account of not using a fusion port save power in the form of reducing the double execution.

Now, assume there was only 1 fusion port available (possibly the other port is being used by a separate dependency chain). Thus, breaking the chain in this situation out-performs fusing all μops.

However, assume that for some reason fusion ports were unavailable for 1 cycle during which A and B' could have launched together. Then, B' is pushed to the next cycle and because there are 2 fusion ports, B' and C' can fuse in the same cycle. Now, in this case breaking the chain may lose performance.

In light of these scenarios, for optimized μop fusion, a producer-consumer pair may desirably dispatch in the same cycle. Also, fusing every μop possible is not always the best course of action, as it can consume unnecessary power and cost performance. Also, without careful selection of which pairs to fuse, a non-critical path may be accelerated, which does not result in a gain in performance. Thus, techniques may be used to determine correct pairs of μops to fuse and launch them together.

Referring now to FIG. 1, shown is a flow diagram of a method in accordance with an embodiment. More specifically as shown in FIG. 1, method 100 is a method for determining whether to perform a fusion operation for a given consumer μop. In an embodiment, method 100 may be performed by allocating hardware circuitry such as an allocation circuit that may include or be coupled to a fusion circuit. The fusion circuit may include or be coupled to a fusion throttle circuit. In other cases, method 100 may be performed by hardware circuitry, in combination with firmware and/or software. Method 100 may be performed to identify whether μop fusion is appropriate for a given consumer μop based at least in part on historical information associated with the μop.

Method 100 begins by receiving a consumer μop within an allocation circuit (block 110). Next it may be determined at diamond 120 whether the consumer μop is capable of fusion. This determination may be based on considerations such as whether it is a simple arithmetic logic unit (ALU)/ address generation unit (AGU) (load/store) operation and whether it can be executed together with its source within the execution time allowed. If it is determined that the consumer μop is not an appropriate candidate for fusion, control passes to block 130 where a fusion process may be stopped and the consumer μop may be allocated to a selected (non-fusion) port at block 140. As such, this consumer μop may be placed into a reservation station or other structure to wait for scheduling onto the selected port.

Still with reference to FIG. 1, instead if it is determined that the consumer μop is a candidate for fusion, control passes to block 150 where a blocklist cache or other structure may be accessed, e.g., using an instruction pointer or other identifier of the μop. Based on the accessed entry it is determined at diamond 160 whether a confidence value or other value present in the entry exceeds a threshold. If it does, control passes back to block 130 where fusion operations may be stopped for this consumer μop.

Otherwise, if the confidence value does not exceed the threshold, control passes to block 170 where the consumer μop may be fused with its producer μop into a fused μop. Thereafter, control passes to block 180 where this fused μop may be allocated to a selected fusion port. As such, this fused μop may be placed into the reservation station or other structure to wait for scheduling onto the selected fusion port. While shown at this high level in the embodiment of FIG. 1, many variations and alternatives are possible.

Figure 2:
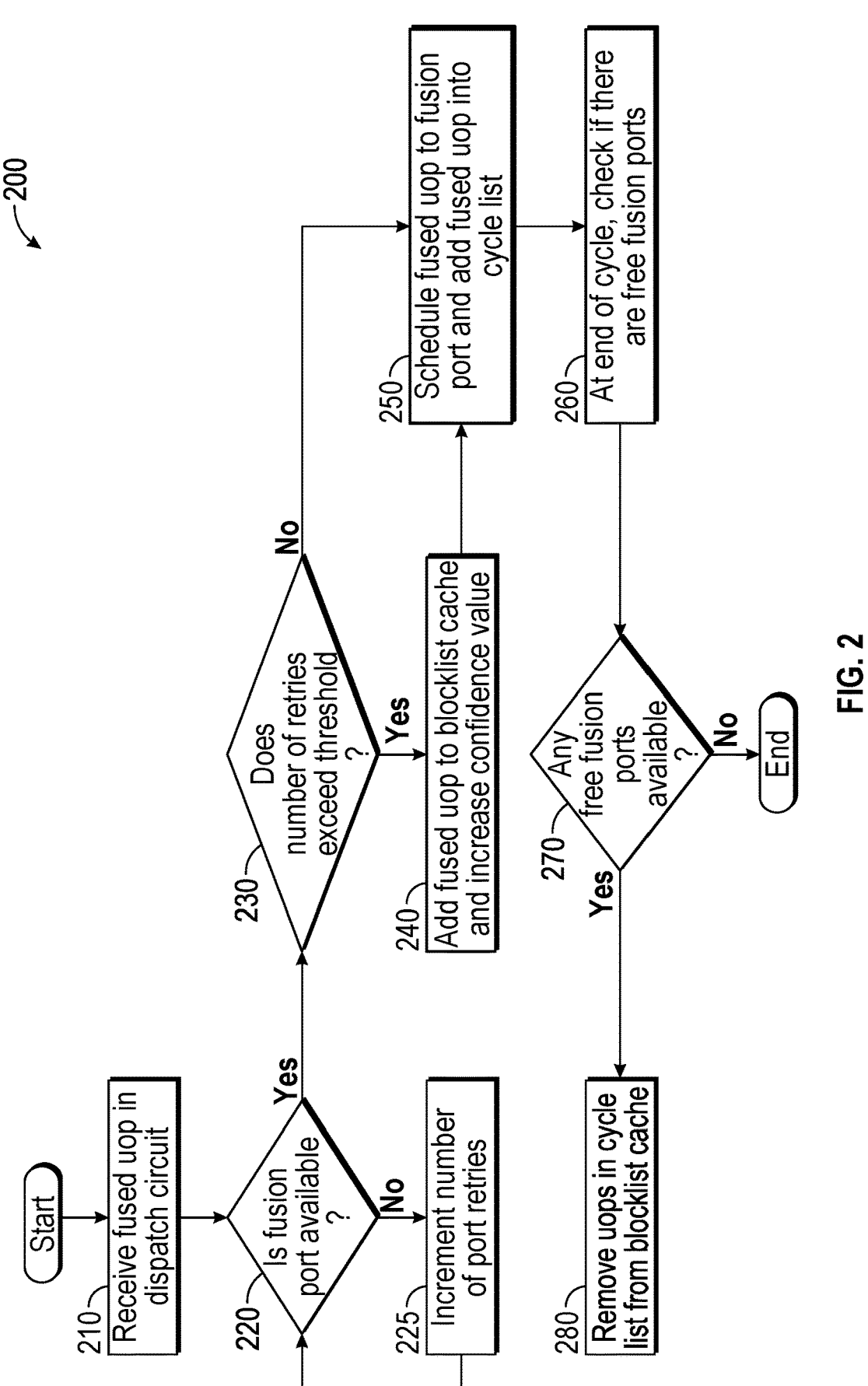
FIG. 2 is a flow diagram of a method in accordance with another embodiment.

Referring now to FIG. 2, shown is a flow diagram of a method in accordance with another embodiment. More specifically as shown in FIG. 2, method 200 is a method for performing training of a fusion throttle circuit in accordance with an embodiment. In an embodiment, method 200 may be performed by dispatch hardware circuitry such as a dispatch or scheduler circuit to update historical information associated with a fused μop, based on scheduling conditions or so forth. In other cases, method 200 may be performed by hardware circuitry, in combination with firmware and/or software.

As illustrated, method 200 begins by receiving a fused μop within a dispatch circuit (block 210). At diamond 220 it is determined whether the fusion port to which this fused μop is allocated is available. If not, a number of port retries for this fused μop may be incremented (block 225), and control passes back to diamond 220.

If it is determined that a port is available, control passes to diamond 230 to determine whether the number of retries exceeds a threshold. If not, control passes to block 250 described below. If it is determined that the number of retries exceeds the threshold, an entry within the blocklist cache may be added for this fused μop and a confidence value is increased (e.g., from zero to one) for this entry. Note that if an entry for this fused μop already exists in the blocklist cache, no additional entry is added and the confidence value of the entry is simply increased.

Still referring to FIG. 2, control next passes to block 250 where identification of this fused μop may be added into a cycle list. The cycle list is a list of all fused μops that have been scheduled onto an available fusion port in this cycle. Note also at block 250 this fused μop may be dispatched to the available fusion port. Then at block 260 at the end of the cycle, it is determined whether there are any free (available) fusion ports. If so, as determined at diamond 270, any μops on this cycle list may be removed from the blocklist cache (block 280). This is so, since such μops do not impact performance, given the available free fusion ports. Note that if there are no free ports available, the training may conclude with respect to this cycle. While shown at this high level in the embodiment of FIG. 2, many variations and alternatives are possible.

Figure 3:
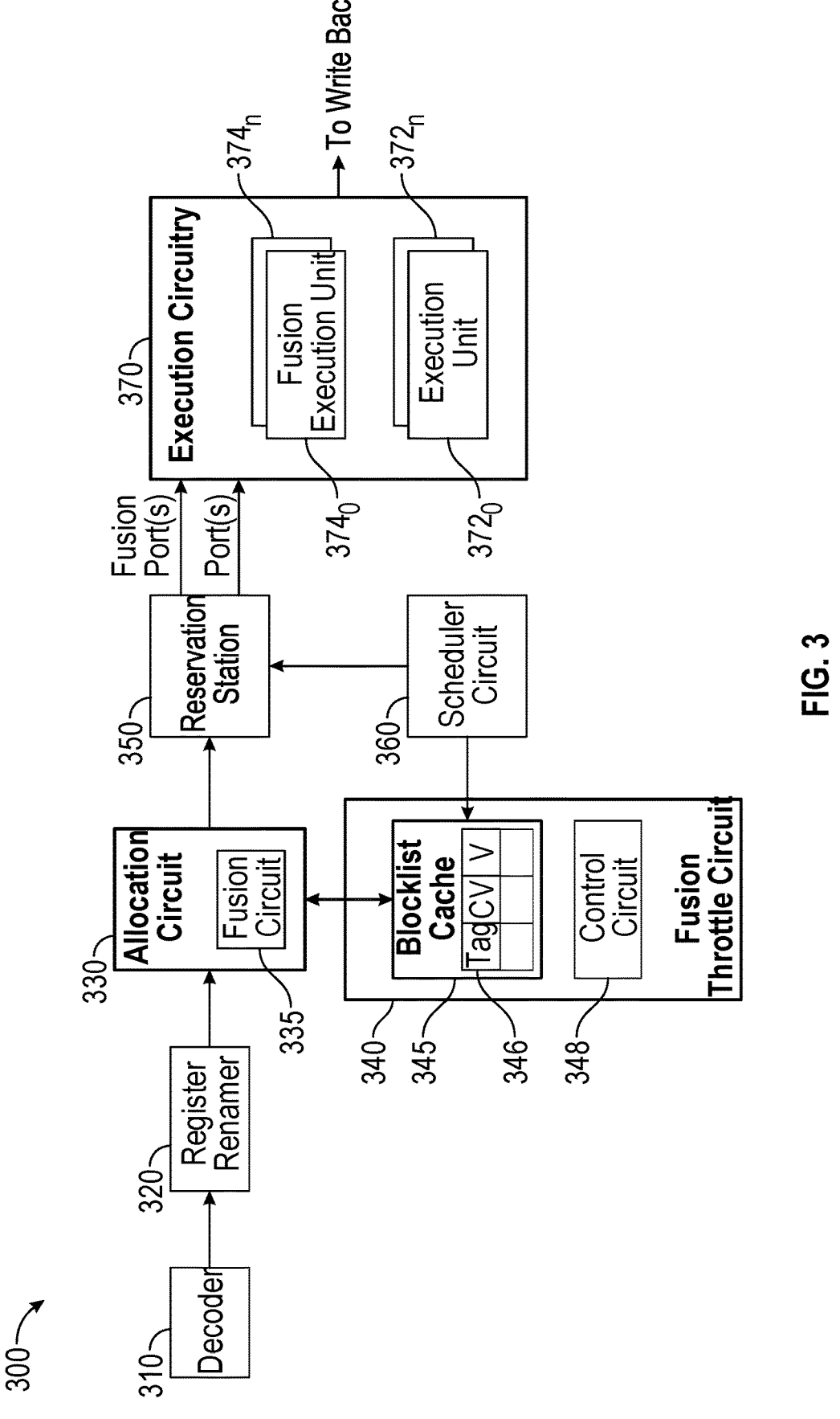
FIG. 3 is a block diagram of a processor in accordance with an embodiment.

Referring now to FIG. 3, shown is a block diagram of a portion of a processor in accordance with an embodiment. In FIG. 3, processor 300 is shown at a high level, and more particularly shows parts of a processing core or other processing engine that perform instruction decode, scheduling, execution and so forth.

In the high level shown, incoming instructions are provided to a decoder 310. Decoder 310 may receive the incoming instructions, which may be in the form of macro-instructions, and decode each instruction into one or more μops for execution. In turn, the μops may be passed to a register renamer 320, which may rename a limited number of architectural registers onto the larger number of available registers of a physical register file.

The μops are then provided to an allocation circuit 330. Allocation circuit 330 may perform allocation operations to allocate particular μops to selected ports, where each port may be associated with one or more execution units. In the embodiment shown in FIG. 3, allocation circuit 330 includes a fusion circuit 335. In embodiments herein, fusion circuit 335 may be configured to identify presence of producer-consumer pairs of μops and perform a fusion operation to generate a fused μop for the consumer μop. This fused μop is a concatenation of the producer μop and the consumer μop, such that the fused μop has more than two source operands and may perform more than one operation. It will be understood that the producer μop still continues through the pipeline, while the fused μop takes the place of the consumer μop.

With embodiments herein, fusion circuit 335 may, during its fusion processing, consult a blocklist cache 345 included in a fusion throttle circuit 340 to determine whether to perform fusion for a given μop. Although shown as a separate circuit, in some embodiments fusion throttle circuit 340 may be included within allocation circuit 330 (e.g., within fusion circuit 335). As described herein, historical information associated with the fused μop (and/or consumer μop) may be considered in determining whether to perform fusion. In the embodiment shown, fusion throttle circuit 340 includes a control circuit 348 which may, in response to a request from fusion circuit 335 at allocation, access blocklist cache 345. As shown, blocklist cache 345 includes an array 346 having a plurality of entries, where each entry may store an identifier of a fused μop (e.g., via a tag portion), a corresponding confidence value associated with the fused μop, and a valid bit. This confidence value may be the historical information used to determine whether to allow or throttle fusion of a given μop. In an embodiment, this confidence value may be implemented as a saturating counter, e.g., a 2 bit counter. In this case, when saturated, the threshold is exceeded and fusion does not take place.

Control circuit 348, in addition to performing this access to blocklist cache 345 on behalf of fusion circuit 335 at allocation also may perform training and updating of blocklist cache 345 at scheduling, in response to information from a scheduler circuit 360. Such training/updating may occur as described above with regard to FIG. 2.

Still with reference to FIG. 3, allocated μops output from allocation circuit 330 may be stored in a reservation station 350. In turn, scheduler circuit 360 during a given cycle may identify one or more μops having all sources available and schedule them for execution within execution circuitry 370. As shown, reservation station 350 couples to execution circuitry 370 via multiple ports, including fusion ports and non-fusion ports. In one or more examples, there may be 2N total ports with substantially equal numbers of fusion ports and regular ports. In other cases, there may be more regular ports than fusion ports. In any case, when a given μop is scheduled for execution, it passes through its selected port to one of multiple execution units. As shown, these execution units (also referred to herein as "execution circuits") may include regular execution units $372_{0-N}$ and fusion execution units $374_{0-N}$. In general, execution units 372 may be conventional execution units of a given processor such as arithmetic logic units, multipliers or so forth. In a given micro-architecture, each execution unit 372 may receive a given number of source operands and perform one or more operations thereon to generate results. In many cases, execution units 372 may receive two source operands and perform an operation thereon. In these implementations, corresponding fusion execution units 374 may receive three source operands and perform one or more operations thereon. In general, execution units 372 may be configured to receive M source operands, while fusion execution units 374 may be configured to receive M+1 source operands. After execution, given results are written back, e.g., to a physical register file (not shown for ease of illustration in FIG. 3). Understand while shown at this high level in the embodiment of FIG. 3, many variations and alternatives are possible.

TABLE 1

|  | 2Ports | 2Ports_blklist | 4Ports | 4Ports_blklist |
|---|---|---|---|---|
| IPC % | −5.70% | 19.40% | 22% | 27.10% |
| % Fusion | 50% | 22% | 50% | 35% |

Referring now to Table 1, shown are example performance gains (in terms of instructions per cycle percentage (IPC %) and percentage of fused μops (% Fusion)) using an embodiment for simulation for a processor having 2 fusion ports and 4 fusion ports respectively. As shown, in a 2 port case, a naïve case with increased fusion causes performance loss, while with an embodiment, performance gains while reducing the number of fusions. And for a 4 port case, performance increases by ~5% and the % Fusion (i.e., total number of μops which fuse vs total number of allocated μops) reduces by a third. This is a clear reduction in power penalty as well. Embodiments may be applicable to low instruction level parallelism (ILP) workloads, such as pointer chasing applications.

One or more examples may be used to throttle fused μops depending on the relation between the producer-consumer pair. This technique not only improves performance but also reduces the number of fused μops. Embodiments may intelligently restrict μop fusion to just a few ports, in a processor in which there are a limited number of fusion ports (to result in an area savings). Furthermore, throttling μop fusion as described herein does not add pressure to PRF read ports, and is better for overall power, particularly in execution and rename stages. And by reducing the total number of fusions, the fusion ports are freed up for other μops and by accelerating these other μops, performance is increased.

Figure 4A:
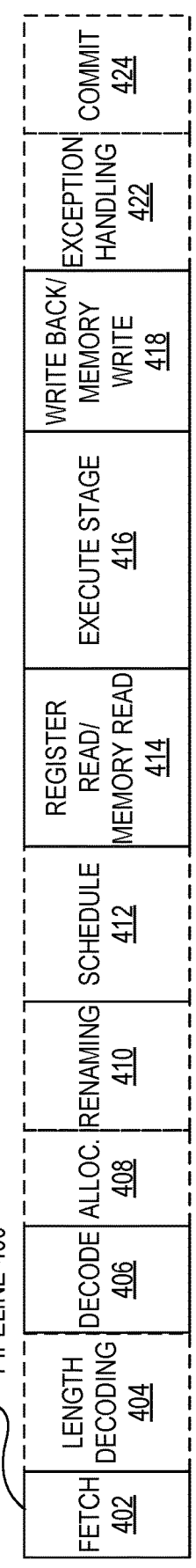
FIGS. 4A and 4B illustrate a block diagram of a more specific exemplary in-order core architecture.
Figure 4B:
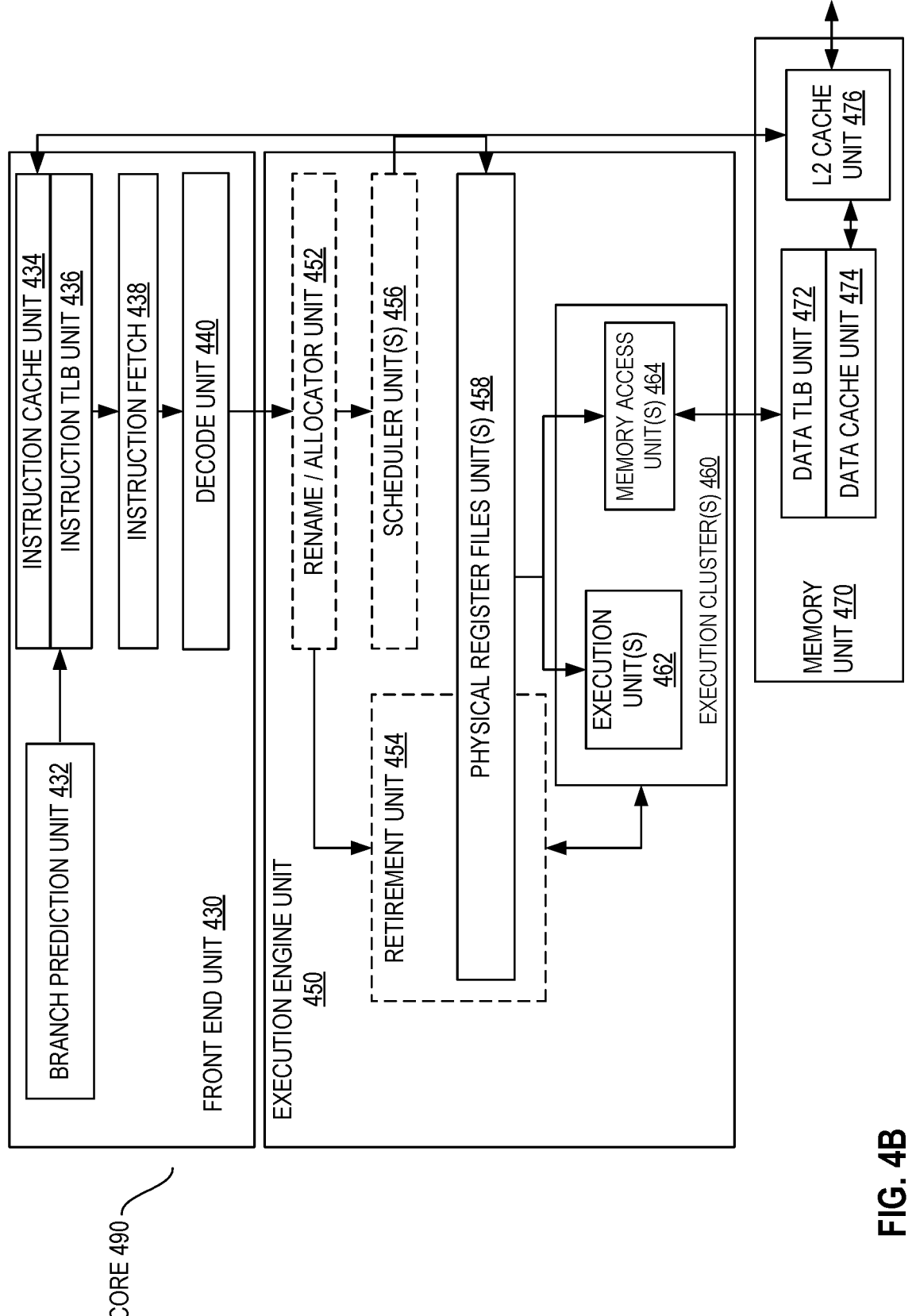

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A and 4B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424. Note that as described herein, in a given embodiment a core may include multiple processing pipelines such as pipeline 400.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464).

It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 (including fusion and fusion throttling circuits as described herein) and renaming stage 410; 4) the scheduler unit(s) 456 performs the schedule stage 412 (and provides feedback for fusion throttling training as described herein); 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
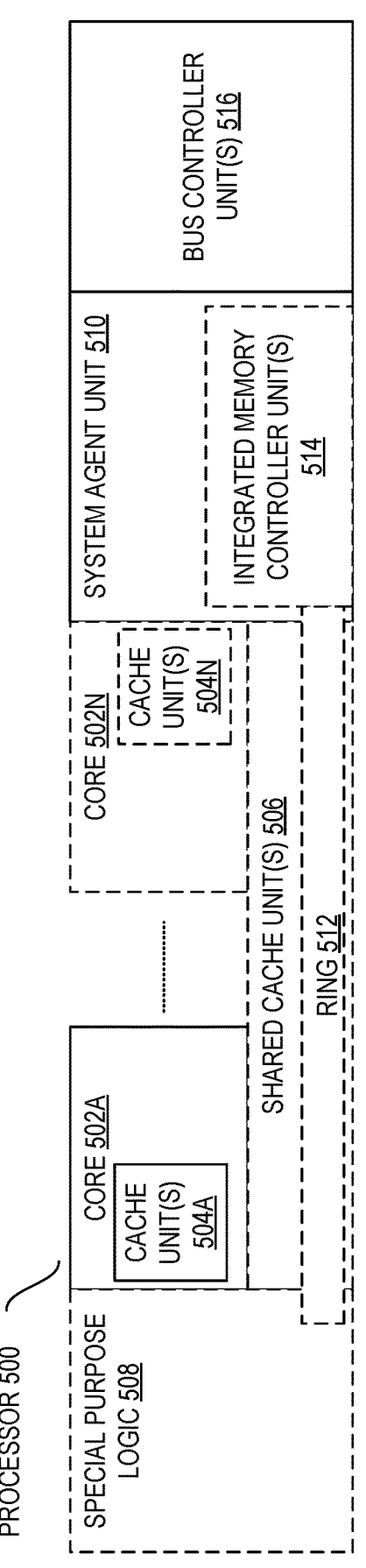
FIG. 5 is a block diagram of a processor according to embodiments of the invention.

FIG. 5 is a block diagram of a processor 500 that may have more than one core, may have an integrated memory controller, and may have integrated graphics and fusion circuitry and fusion throttling circuitry according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) in the system agent unit 910, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache units 504A-N within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the special purpose logic 508, the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502 A-N.

The system agent unit 510 includes those components coordinating and operating cores 502A-N. The system agent unit 510 may include for example a power control unit (PCU) and a display unit. The PCU may be or include logic and components needed for regulating the power state of the cores 502A-N and the special purpose logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Figure 6:
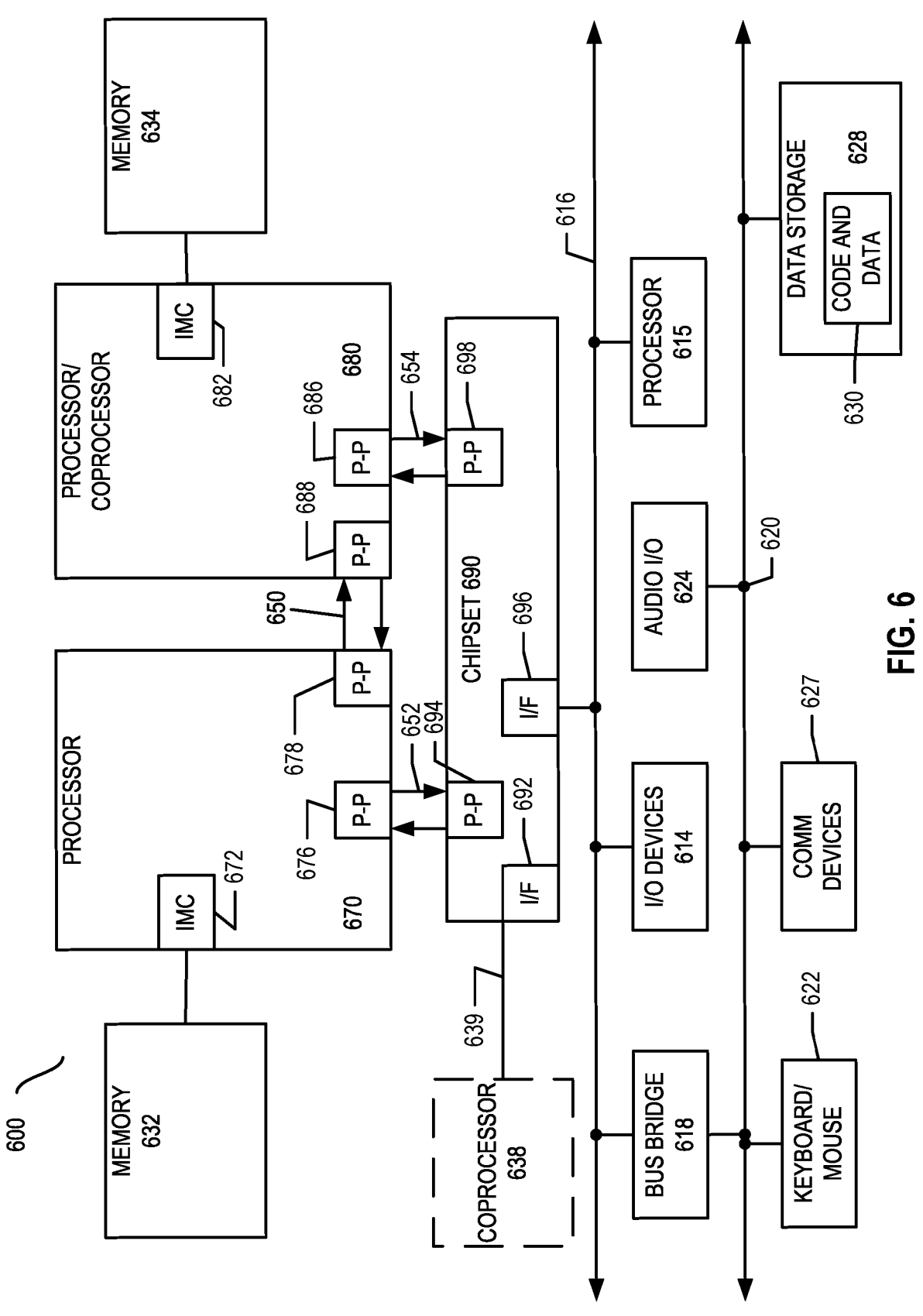
FIG. 6 is a block diagram of a first more specific exemplary system in accordance with an embodiment of the present invention.
Figure 7:
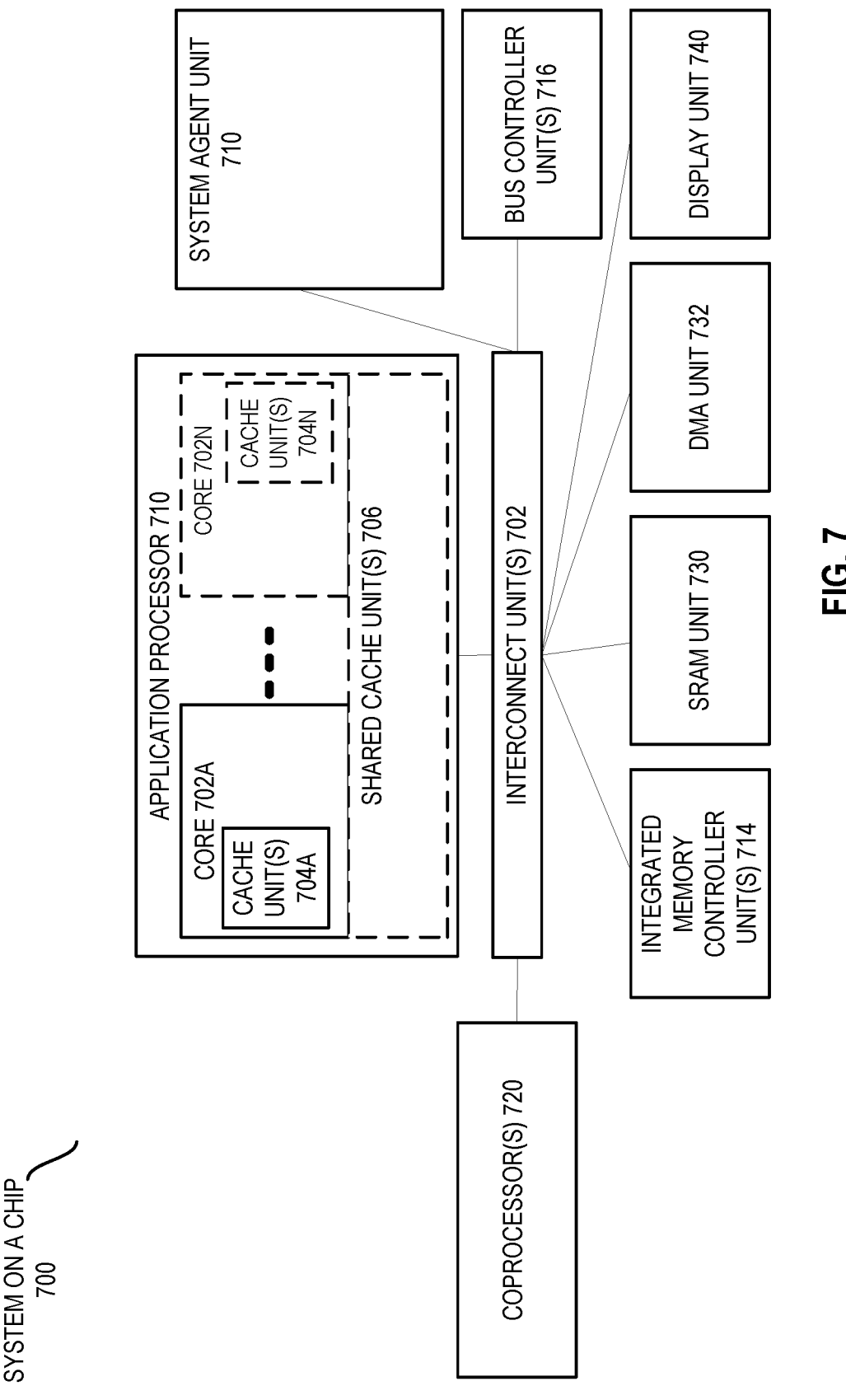
FIG. 7 is a block diagram of a SoC in accordance with an embodiment of the present invention.

FIGS. 6-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 6, shown is a block diagram of a first more specific exemplary system 600 in accordance with an embodiment of the present invention. As shown in FIG. 6, multiprocessor system 600 is a point-to-point interconnect system, and includes a first processor 670 and a second processor 680 coupled via a point-to-point interconnect 650. Each of processors 670 and 680 may be some version of the processor 500.

Processors 670 and 680 are shown including integrated memory controller (IMC) units 672 and 682, respectively. Processor 670 also includes as part of its bus controller units point-to-point (P-P) interfaces 676 and 678; similarly, second processor 680 includes P-P interfaces 686 and 688. Processors 670, 680 may exchange information via a point-to-point (P-P) interface 650 using P-P interface circuits 678, 688. As shown in FIG. 6, IMCs 672 and 682 couple the processors to respective memories, namely a memory 632 and a memory 634, which may be portions of main memory locally attached to the respective processors.

Processors 670, 680 may each exchange information with a chipset 690 via individual P-P interfaces 652, 654 using point to point interface circuits 676, 694, 686, 698. Chipset 690 may optionally exchange information with the coprocessor 638 via a high-performance interface 639. In one embodiment, the coprocessor 638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present invention is not so limited.

As shown in FIG. 6, various I/O devices 614 may be coupled to first bus 616, along with a bus bridge 618 which couples first bus 616 to a second bus 620. In one embodiment, one or more additional processor(s) 615, such as coprocessors, high-throughput MIC processors, GPGPU's, accelerators (such as, e.g., graphics accelerators or digital signal processing (DSP) units), field programmable gate arrays, or any other processor, are coupled to first bus 616. In one embodiment, second bus 620 may be a low pin count (LPC) bus. Various devices may be coupled to a second bus 620 including, for example, a keyboard and/or mouse 622, communication devices 627 and a storage unit 628 such as a disk drive or other mass storage device which may include instructions/code and data 630, in one embodiment. Further, an audio I/O 624 may be coupled to the second bus 620. Note that other architectures are possible. For example, instead of the point-to-point architecture of FIG. 6, a system may implement a multi-drop bus or other such architecture.

Referring now to FIG. 7, shown is a block diagram of a SoC 700 in accordance with an embodiment of the present invention. Dashed lined boxes are optional features on more advanced SoCs. In FIG. 7, an interconnect unit(s) 702 is coupled to: an application processor 710 which includes a set of one or more cores 702A-N (including constituent cache units 704A-N) and shared cache unit(s) 706; a system agent unit 710; a bus controller unit(s) 716; an integrated memory controller unit(s) 714; a set or one or more copro- cessors 720 which may include integrated graphics logic, an image processor, an audio processor, and a video processor; a static random access memory (SRAM) unit 730; a direct memory access (DMA) unit 732; and a display unit 740 for coupling to one or more external displays. In one embodi- ment, the coprocessor(s) 720 include a special-purpose processor, such as, for example, a network or communica- tion processor, compression engine, GPGPU, a high- throughput MIC processor, embedded processor, or the like.

Embodiments of the mechanisms disclosed herein may be implemented in hardware, software, firmware, or a combi- nation of such implementation approaches. Embodiments of the invention may be implemented as computer programs or program code executing on programmable systems compris- ing at least one processor, a storage system (including volatile and non-volatile memory and/or storage elements), at least one input device, and at least one output device.

Program code, such as code 630 illustrated in FIG. 6, may be applied to input instructions to perform the functions described herein and generate output information. The out- put information may be applied to one or more output devices, in known fashion. For purposes of this application, a processing system includes any system that has a proces- sor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, with- out limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable program- mable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, cir- cuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruc- tion converter may be implemented in software, hardware, firmware, or a combination thereof. The instruction con- verter may be on processor, off processor, or part on and part off processor.

Figure 8:
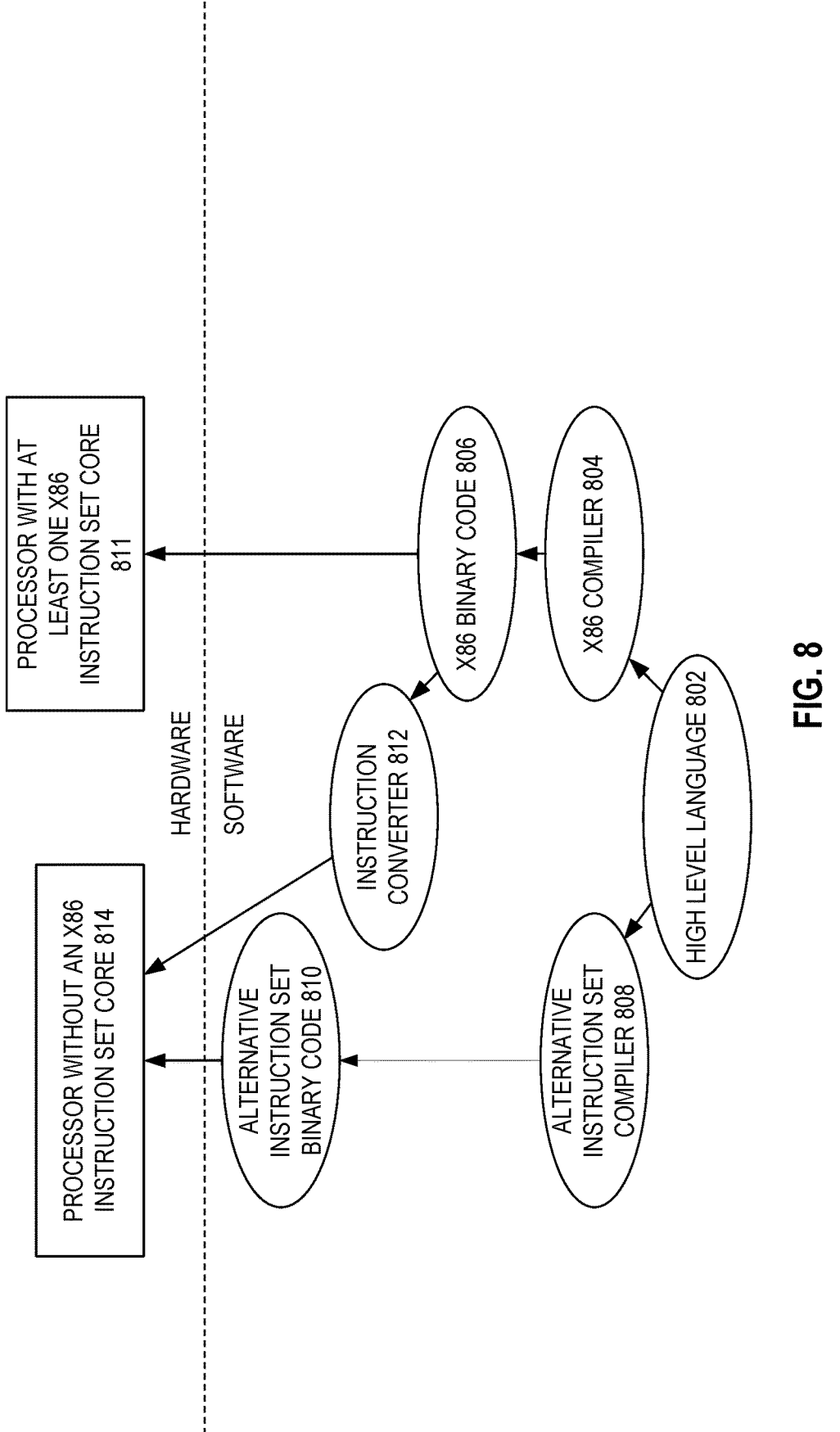
FIG. 8 is a block diagram contrasting the use of a software instruction converter to convert binary instructions in a source instruction set to binary instructions in a target instruction set according to embodiments of the invention.

FIG. 8 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firm- ware, hardware, or various combinations thereof. FIG. 8 shows a program in a high level language 802 may be compiled using an x86 compiler 804 to generate x86 binary code 806 that may be natively executed by a processor with at least one x86 instruction set core 816. The processor with at least one x86 instruction set core 816 represents any processor that can perform substantially the same functions as an Intel processor with at least one x86 instruction set core by compatibly executing or otherwise processing (1) a substantial portion of the instruction set of the Intel x86 instruction set core or (2) object code versions of applica- tions or other software targeted to run on an Intel processor with at least one x86 instruction set core, in order to achieve substantially the same result as an Intel processor with at least one x86 instruction set core. The x86 compiler 804 represents a compiler that is operable to generate x86 binary code 806 (e.g., object code) that can, with or without additional linkage processing, be executed on the processor with at least one x86 instruction set core 816. Similarly, FIG. 8 shows the program in the high level language 802 may be compiled using an alternative instruction set compiler 808 to generate alternative instruction set binary code 810 that may be natively executed by a processor without at least one x86 instruction set core 814 (e.g., a processor with cores that execute the MIPS instruction set of MIPS Technologies of Sunnyvale, CA and/or that execute the ARM instruction set of ARM Holdings of Sunnyvale, CA). The instruction converter 812 is used to convert the x86 binary code 806 into code that may be natively executed by the processor without an x86 instruction set core 814. This converted code is not likely to be the same as the alternative instruction set binary code 810 because an instruction converter capable of this is difficult to make; however, the converted code will accom- plish the general operation and be made up of instructions from the alternative instruction set. Thus, the instruction converter 812 represents software, firmware, hardware, or a combination thereof that, through emulation, simulation or any other process, allows a processor or other electronic device that does not have an x86 instruction set processor or core to execute the x86 binary code 806.

The following examples pertain to further embodiments.

In one example, an apparatus comprises: a plurality of execution circuits to execute μops, where a subset of the plurality of execution circuits are capable of execution of a fused μop; a fusion circuit coupled to at least the subset of the plurality of execution circuits, wherein the fusion circuit is to fuse one or more pairs of producer-consumer μops into fused μops; and a fusion throttle circuit coupled to the fusion circuit, wherein the fusion throttle circuit is to prevent a first μop from being fused with another μop based at least in part on historical information associated with the first μop.

In an example, the fusion throttle circuit comprises a memory to store a plurality of entries, each of the plurality of entries to store an identifier of a fused μop and the historical information comprising a confidence value.

In an example, the fusion throttle circuit is to prevent the fusion of the first μop with the another μop based on a comparison between the confidence value of an entry in the memory associated with the first μop and a threshold.

In an example, the fusion throttle circuit is to update the confidence value of a first entry in the memory associated with a first fused μop when a number of attempts to dispatch the first fused μop exceeds a second threshold.

In an example, the fusion throttle circuit is to remove an entry associated with a fused μop from the memory when the fused μop is dispatched in a cycle in which at least one of the subset of the plurality of execution circuits is free.

In an example, the apparatus further comprises an allocation circuit comprising the fusion circuit, where the allocation circuit is to consult the fusion throttle circuit and fuse a second μop with a third μop to form a second fused μop based at least in part on historical information associated with the second μop.

In an example, the apparatus further comprises a reservation station coupled to the allocation circuit, where the allocation circuit is to provide the second fused μop to the reservation station.

In an example, the apparatus further comprises a scheduler circuit coupled to the reservation station, the scheduler circuit to schedule in a first cycle the second fused μop to one of the subset of the plurality of execution circuits.

In an example, the scheduler circuit is to schedule in the first cycle the third μop to another one of the plurality of execution circuits, the third μop a producer μop and the second μop a consumer μop.

In an example, at least one of the subset of the plurality of execution circuits is to receive more than two source operands and perform on an operation on the more than two source operands in a single cycle.

In another example, a method comprises: receiving, in an allocation circuit of a processor, a first μop and a second μop, the second μop a consumer μop and the first μop a producer μop; accessing historical information associated with the second μop; and preventing fusion of the first μop with the second μop based at least in part on the historical information, and independently allocating and dispatching the first μop and the second μop to one or more execution circuits.

In an example, the method further comprises accessing the historical information comprising a confidence value stored in an entry of a cache memory associated with the second μop.

In an example, the method further comprises preventing the fusion when the confidence value exceeds a threshold.

In an example, the method further comprises updating the entry of the cache memory in response to another iteration of the second μop, wherein the another iteration of the second μop comprises a fused μop formed of the first μop and the second μop.

In an example, the method further comprises: receiving, in the allocation circuit, a third μop and a fourth μop, the fourth μop a consumer μop and the third μop a producer μop; accessing historical information associated with the fourth μop; and fusing the third μop with the fourth μop into a fourth fused μop based at least in part on the historical information, and allocating and dispatching the fourth fused μop to a fusion execution circuit.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a processor comprises: an allocation circuit to allocate μops to execution ports that couple to execution units; a scheduler circuit coupled to the allocation circuit, where the scheduler circuit is to schedule the μops to allocated execution ports, and the execution units coupled to the scheduler circuit to execute scheduled μops, where a subset of the execution units are capable of execution of a fused μop. The allocation circuit may fuse at least one pair of producer-consumer μops into a fused μop when the at least one pair is to be scheduled in a same cycle and to not fuse a first consumer μop with a first producer μop based at least in part on historical information associated with the first consumer μop.

In an example, the processor further comprises memory to store a plurality of entries, each of the plurality of entries to store an identifier of a fused μop and the historical information comprising a confidence value.

In an example, the allocation circuit is to prevent fusion of the first consumer μop with the first producer μop based on a comparison between the confidence value of an entry in the memory associated with the first consumer μop and a threshold.

In an example, the scheduler circuit is to update the confidence value of a first entry in the memory associated with a first fused μop when a number of attempts to schedule the first fused μop exceeds a second threshold.

In an example, the subset of the execution units are to receive M+1 source operands and others of the execution units are to receive M source operands.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EE-PROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
a plurality of execution circuits to execute micro-operations ($\mu$ops), wherein a subset of the plurality of execution circuits are capable of execution of a fused $\mu$op;
a fusion circuit coupled to at least the subset of the plurality of execution circuits, wherein the fusion circuit is to fuse one or more pairs of producer-consumer $\mu$ops into fused $\mu$ops; and
a fusion throttle circuit coupled to the fusion circuit, the fusion throttle circuit comprising a memory to store a plurality of entries, each of the plurality of entries to store an identifier of a fused $\mu$op and associated historical information comprising a confidence value, wherein the fusion throttle circuit is to prevent a first $\mu$op from being fused with another $\mu$op based at least in part on historical information associated with the first $\mu$op and, wherein the fusion throttle circuit is to update the confidence value of a first entry in the memory associated with a first fused $\mu$op when a number of attempts to dispatch the first fused $\mu$op exceeds a threshold.

2. The apparatus of claim 1, wherein the fusion throttle circuit is to prevent the fusion of the first pop with the another $\mu$op based on a comparison between the confidence value of an entry in the memory associated with the first $\mu$op and a second threshold.

3. The apparatus of claim 1, wherein the fusion throttle circuit is to remove an entry associated with a fused uop from the memory when the fused $\mu$op is dispatched in a cycle in which at least one of the subset of the plurality of execution circuits is free.

4. The apparatus of claim 1, further comprising an allocation circuit comprising the fusion circuit, wherein the allocation circuit is to consult the fusion throttle circuit and fuse a second $\mu$op with a third $\mu$op to form a second fused $\mu$op based at least in part on historical information associated with the second $\mu$op.

5. The apparatus of claim 4, further comprising a reservation station coupled to the allocation circuit, wherein the allocation circuit is to provide the second fused $\mu$op to the reservation station.

6. The apparatus of claim 5, further comprising a scheduler circuit coupled to the reservation station, the scheduler circuit to schedule in a first cycle the second fused $\mu$op to one of the subset of the plurality of execution circuits.

7. The apparatus of claim 6, wherein the scheduler circuit is to schedule in the first cycle the third $\mu$op to another one of the plurality of execution circuits, the third $\mu$op a producer $\mu$op and the second $\mu$op a consumer uop.

8. The apparatus of claim 1, wherein at least one of the subset of the plurality of execution circuits is to receive more than two source operands and perform on an operation on the more than two source operands in a single cycle.

9. A processor comprising:
an allocation circuit to allocate micro-operations ($\mu$ops) to execution ports that couple to execution units;
a scheduler circuit coupled to the allocation circuit, wherein the scheduler circuit is to schedule the $\mu$ops to allocated execution ports;
the execution units coupled to the scheduler circuit to execute scheduled $\mu$ops, wherein a subset of the execution units are capable of execution of a fused $\mu$op; and
a memory to store a plurality of entries, each of the plurality of entries to store an identifier of a fused uop and associated historical information comprising a confidence value,
wherein the allocation circuit is to fuse at least one pair of producer-consumer $\mu$ops into a fused $\mu$op when the at least one pair is to be scheduled in a same cycle and to not fuse a first consumer $\mu$op with a first producer $\mu$op based at least in part on historical information associated with the first consumer $\mu$op, and wherein the allocation circuit is to prevent fusion of the first consumer $\mu$op with the first producer $\mu$op based on a comparison between the confidence value of an entry in the memory associated with the first consumer $\mu$op and a threshold.

10. The processor of claim 9, wherein the scheduler circuit is to update the confidence value of a first entry in the memory associated with a first fused $\mu$op when a number of attempts to schedule the first fused $\mu$op exceeds a second threshold.

11. The processor of claim 9, wherein the subset of the execution units are to receive M+1 source operands and others of the execution units are to receive M source operands.

* * * * *